United States Patent [19]

Tsujioka

[11] Patent Number: 4,790,077

[45] Date of Patent: Dec. 13, 1988

[54] RULER FOR FIXED-DISTANCE MOVEMENT

[75] Inventor: Hiroshi Tsujioka, Nara, Japan

[73] Assignee: Sharp Kabushiki Kaisha, Osaka, Japan

[21] Appl. No.: 100,823

[22] Filed: Sep. 25, 1987

[30] Foreign Application Priority Data

Sep. 26, 1986 [JP] Japan .................. 61-228673

[51] Int. Cl.[4] .......................... B43L 13/02
[52] U.S. Cl. .................................. 33/447
[58] Field of Search ............ 33/443, 430, 445, 446, 33/447, 450, 403, 40

[56] References Cited

U.S. PATENT DOCUMENTS

| 121,026 | 11/1871 | Briesen | 434/117 |
| 2,439,291 | 4/1948 | Fielding | 33/450 |
| 2,822,736 | 2/1958 | Padgett | 33/427 X |
| 4,679,328 | 7/1987 | Saad | 33/447 |

FOREIGN PATENT DOCUMENTS

| 234750 | 6/1925 | United Kingdom | 434/117 |
| 296932 | 9/1928 | United Kingdom | 434/117 |

Primary Examiner—Harry N. Haroian
Attorney, Agent, or Firm—Birch, Stewart, Kolasch & Birch

[57] ABSTRACT

A ruler for fixed-distance movement which includes a guide member provided at one end of a linear ruler section and slidable at a specified angle along a guide section of a base plate; a leaf spring containing a projection, mounted at the same one end of the ruler section; a corrugated gear provided along the same guide section of the base plate, the corrugated gear having a plurality of recesses at regular intervals for engagement with the projection of the leaf spring. The projection of the leaf spring, when engaged with a recess of the corrugated gear, stops the movement of the ruler section, thus enabling the ruler section to move step-by-step over a fixed distance at a specified angle to the guide section.

2 Claims, 1 Drawing Sheet

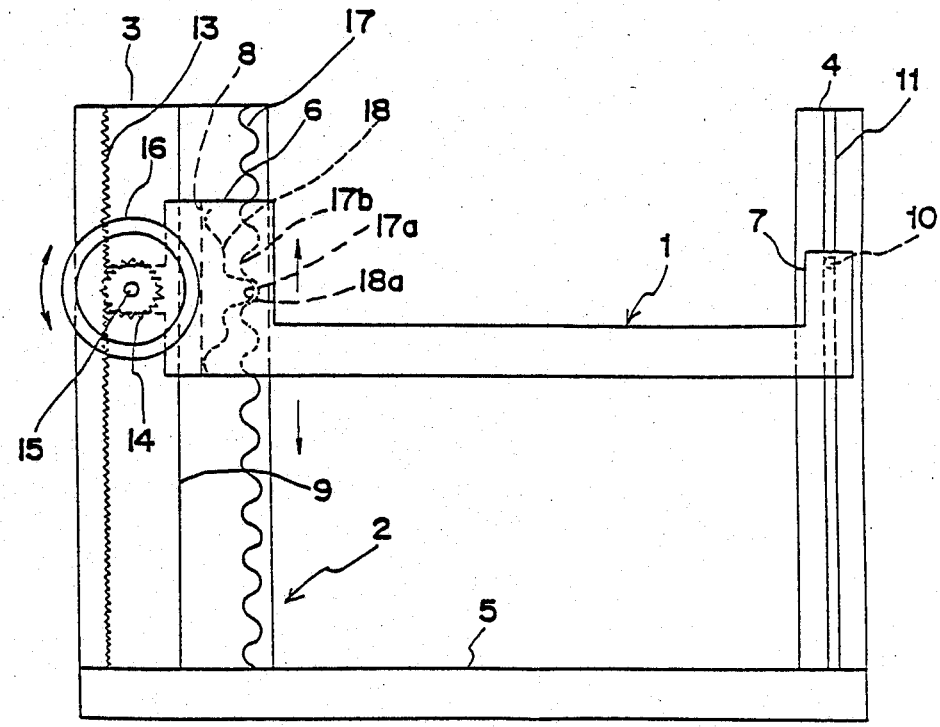

RULER FOR FIXED-DISTANCE MOVEMENT

BACKGROUND OF THE INVENTION

The present invention relates to a ruler which is movable step by step over a fixed distance and suitable for use with a scanner of a limited scanning width in reading data on a specified area of a document.

A small, inexpensive scanner has a narrow scanning width so that every time it reads a line, it must be shifted repeatedly over a distance corresponding to the scanning width to read the next line until it has scanned the entire data area. The conventional means so far provided for moving the scanner, step-by-step over a fixed distance is complicated in the construction as well as in the operation.

SUMMARY OF THE INVENTION

In view of the above conventional problems, the object of the present invention is to provide a ruler for fixed-distance movement that enables a scanner with a narrow scanning width to shift step-by-step over a fixed distance, facilitating the data reading by the scanner.

To achieve the above object, according to the present invention, a ruler for fixed-distance movement comprises a guide member provided at an end of a linear ruler section and slidable at a specified angle along a guide section of a base plate; a leaf spring containing a projection and mounted at an end of the ruler section; and a corrugated gear provided along the guide section of the base plate, the corrugated gear having recesses at regular intervals for engagement with the projection of the leaf spring. The projection of the leaf spring, when it is engaged with one of the recesses of the corrugated gear, stops the movement of the ruler section, thus allowing the ruler section to move step-by-step over a fixed distance at a specified angle with the guide section.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

The single FIGURE is a front view of an embodiment of the ruler of the present invention.

DESCRIPTION OF THE PREFERRED EMBODIMENT

Referring to the drawing, there is seen a horizontal linear ruler section 1 for guiding a scanner (not shown). A base plate 2 is provided on which the ruler section 1 is mounted so as to be slidable vertically in the direction of the arrows. The base plate 2 comprises two vertical guide sections 3 and 4 arranged on either side of the ruler section 1 and a stopper 5 whose ends are connected to the respective lower ends of the guide sections 3 and 4.

Upward bent portions 6 and 7 are formed integrally with the ends of the linear ruler section 1. A guide member 8 projects from the rear side of the bent portion 6. A side of the guide member 8 is made slidably in contact with a vertical step 9 formed in the center of the guide section 3. A guide protrusion 10 is provided in the rear side of the other bent portion 7. The protrusion 10 bits slidably in a vertical groove 11 formed in the guide section 4. Thus, the ruler section 1 is allowed to move at a specified angle (right angle) to the vertical guide sections 3 and 4.

A rack 13 is mounted on a side of the guide section 3. A pinion 14 for engagement with the rack 13 is rotatably mounted through a shaft 15 on the bent portion 6. The shaft 15 is provided with an operation knob 16. As the knob 16 is rotated, the pinion 14 moves on the rack 13, causing the ruler section 1 to shift its position. Along the opposite side of the guide section 3 is mounted a corrugated gear 17, which comprises recesses 17a at uniform intervals and risings 17b between recesses 17a. The pitch of the recesses 17a coincides with the scanning width of the scanner. The guide member 8 of the bent portion 6 is provided with a leaf spring 18 which contains a projection 18a to be engaged with one of the recesses 17a of the corrugated gear 17. A fixed-distance movement is effected by this projection 18a which moves along the corrugated gear 17 and stops in each recess 17a. The position of the projection 18a of the leaf spring 18 is lower than that of the protrusion 10 on the other bent portion 7. Once the projection 18a of the leaf spring 18 engages engaged with a recess 17a of the corrugated gear 17, the engagement is retained by the spring force. Therefore, the ruler section 1 is held at the stopping position unless an external force is applied. The ruler section 1 is always forced to rotate clockwise around the contact point between the projection 18a and the recess 17a as a fulcrum. However, the clockwise rotation is prevented by the protrusion 10 fit in the groove 11 at a higher position than the fulcrum. Due to this mechanism, the ruler section 1 is always retained in a horizontal position at right angle to the guide sections 3 and 4.

With the ruler section 1 held at a stopping position, the scanner is moved from left to right to read a line. When the line has been read, the knob 16 is rotated clockwise to lower the ruler section 1. At this time, the projection 18a of the leaf spring 18 is deformed by being depressed against a rising 17b of the corrugated gear 17 as it passes the rising 17b. When the projection 18a engages the next recess 17a, the rotation of the knob 16 is stopped. With this operation, the ruler section 1 moves over a distance of one pitch from a recess 17a to the next recess 17a. Since the recess-to-recess pitch has been set to coincide with the scanning width of the scanner, the scanner reads the next line to the line just read by the previous scanning operation as it is moved along the ruler section 1. By repeating the above procedure, it is possible to read all of the data on a specified area of a document. Application of the ruler of the present invention is not limited to a scanner. It may be applied conveniently to any device that needs to be moved a fixed distance. The fixed moving distance can be varied easily by changing the recess-to-recess pitch of the corrugated gear 17. According to the present invention, as described above, after the scanner is moved along the ruler section to read a line, the ruler section is shifted down over a fixed distance to the next stop position where the scanner is moved along the ruler section to read the next line. This procedure is repeated continuously until all the data on a specified area of a document has been read. As obvious from the above description, according to the present invention, the ruler section can be moved step by step over a fixed distance at a specified angle with the base plate, simply by rotating the operation knob. Accordingly, the ruler of the present invention enables a scanner with a narrow reading width to read all of the data on a document easily by operating the knob a plurality of times. The ruler of the present invention is, therefore, extremely effective when used in reading a document with a small, cheap scanner of a narrow scanning width.

While only certain embodiments of the present invention have been described, it will be apparent to those skilled in the art that various changes and modifications may be made therein without departing from the spirit and scope of the present invention as claimed.

What is claimed is:

1. A ruler for fixed-distance movement which comprises:

ruler section with upward bent portions at each end, with a guide member projecting from the rear side of one of said bent portions, and a guide protrusion provided on the rear side of the other of said bent portions, base plate having two vertical guide sections, one of said vertical guide sections having a vertical step formed in the center thereof with which said guide member makes slidable contact, the other of said vertical guide sections having a vertical groove formed thereon in which said guide protrusion is slidably mounted such that said ruler section moves at a specified angle with respect to said vertical guide sections, a corrugated gear provided along one side of said vertical guide section having said vertical step formed thereon, which gear comprises recesses at uniform intervals, and a leaf spring provided on said guide member having a projection thereon for engagement with said recesses of said corrugated gear, whereby movement of said ruler section is intermittently stopped by engagement of said projection of said leaf spring with one of said recesses, thus effecting movement of said ruler section step-by-step over a fixed distance at said specified angle.

2. A ruler for fixed-distance movement as in claim 1, further comprising a pinion mounted on said bent portion of said ruler section having said guide member thereon and a rack mounted on a side of said vertical guide section having said vertical step formed thereon opposite said corrugated gear for engagement with said pinion, said ruler section being moved along said respective guide section by the rotation of said pinion.

* * * * *